(12) United States Patent
Delp et al.

(10) Patent No.: US 8,364,383 B2
(45) Date of Patent: Jan. 29, 2013

(54) METHOD AND APPARATUS FOR CONTROLLING AN INTERNAL COMBUSTION ENGINE

(75) Inventors: Matthias Delp, Bad Abbach (DE); Jürgen Dingl, Regensburg (DE); Bernhard Niebler, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 111 days.

(21) Appl. No.: 12/812,496

(22) PCT Filed: Dec. 10, 2008

(86) PCT No.: PCT/EP2008/067179
§ 371 (c)(1),
(2), (4) Date: Jul. 12, 2010

(87) PCT Pub. No.: WO2009/087008
PCT Pub. Date: Jul. 16, 2009

(65) Prior Publication Data
US 2010/0299050 A1    Nov. 25, 2010

(30) Foreign Application Priority Data

Jan. 10, 2008 (DE) .......................... 10 2008 003 833

(51) Int. Cl.
*F02D 9/08* (2006.01)
*F02D 13/00* (2006.01)

(52) U.S. Cl. ........ 701/103; 701/110; 123/399; 123/403; 123/90.15

(58) Field of Classification Search ................... 123/399, 123/403, 404, 345–348, 90.15, 337; 701/110, 701/103
See application file for complete search history.

(56) References Cited

U.S. PATENT DOCUMENTS

| | | | | |
|---|---|---|---|---|
| 6,502,543 B1 * | 1/2003 | Arai et al. | ...................... | 123/348 |
| 6,502,545 B1 * | 1/2003 | Ganser et al. | .................. | 123/399 |
| 7,077,103 B2 | 7/2006 | Henn et al. | ..................... | 123/399 |
| 7,386,387 B2 | 6/2008 | Bauer et al. | ................... | 701/103 |
| 7,640,093 B2 * | 12/2009 | Watanabe et al. | ............. | 701/103 |
| 7,654,236 B2 | 2/2010 | Dingl et al. | ................ | 123/90.17 |

FOREIGN PATENT DOCUMENTS

| | | |
|---|---|---|
| DE | 102004038338 | 4/2006 |
| DE | 102004061142 | 7/2006 |

(Continued)

OTHER PUBLICATIONS

International Search Report and Written Opinion for Application No. PCT/EP2008/067179, (13 pages), Jun. 3, 2009.

(Continued)

*Primary Examiner* — Hai Huynh
(74) *Attorney, Agent, or Firm* — King & Spalding L.L.P.

(57) ABSTRACT

In a method for controlling an internal combustion engine comprising an intake pipe and a throttle valve that is arranged therein, the pressure in the intake pipe is regulated by modifying the opening angle of the throttle valve, and the desired pressure value is adjusted when the valve lift of the internal combustion engine changes. An apparatus for controlling an internal combustion engine has a mechanism for regulating the intake pipe pressure, the mechanism allowing the opening angle of the throttle valve to be influenced as a controlled variable. In addition, at least one device is provided for changing the valve lift of the internal combustion engine while a device is provided for adjusting the desired pressure value to the valve lift.

18 Claims, 2 Drawing Sheets

FOREIGN PATENT DOCUMENTS

| | | |
|---|---|---|
| DE | 102004061143 | 7/2006 |
| EP | 1657421 | 5/2006 |
| EP | 1775448 | 4/2007 |
| JP | 2005-83322 * | 3/2005 |
| WO | 2004016925 | 2/2004 |
| WO | 2006015919 | 2/2006 |

OTHER PUBLICATIONS

German Office Action for Application No. 10 2008 003 833.4 (3 pages), Sep. 17, 2008.

Beer et al. "Der Neue Motor des Porsche 911 Turbo." MTZ 61 (2000) 11, S. 730-743// In German Language Only. (12 pages), 2000.

* cited by examiner

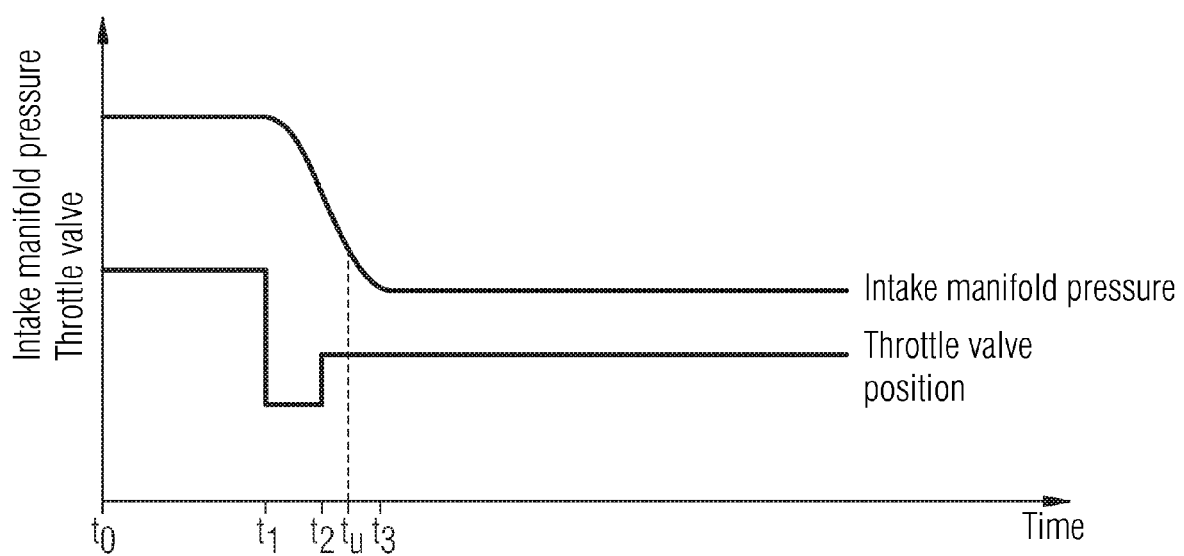

METHOD AND APPARATUS FOR CONTROLLING AN INTERNAL COMBUSTION ENGINE

CROSS-REFERENCE TO RELATED APPLICATIONS

This application is a U.S. National Stage Application of International Application No. PCT/EP2008/067179 filed Dec. 10, 2008, which designates the United States of America, and claims priority to German Application No. 10 2008 003 833.4 filed Jan. 10, 2008, the contents of which are hereby incorporated by reference in their entirety.

TECHNICAL FIELD

The invention relates to a method and an apparatus for controlling an internal combustion engine, the latter having an intake manifold and a throttle valve that is arranged therein. The invention relates in particular to a method for controlling a spark-ignited internal combustion engine.

BACKGROUND

Internal combustion engines of the type cited in the introduction are used in particular as vehicle drives. In addition they are also suited to use in light aircraft and boats.

It is known from DE 10 2004 038 338 B3 to determine the air mass supplied to the engine by means of a mass air flow meter, for example a hot-wire anemometer. The air mass supplied to the engine can then be regulated by means of a throttle valve and/or through adjustment of the valve opening times and/or the valve lift. In a spark-ignited internal combustion engine having exhaust gas aftertreatment it is usually desired to set the fuel/air ratio $\lambda$ to the stoichiometric ratio ($\lambda=1$). Thus, the amount of fuel that is to be injected, and hence the energy conversion per power stroke, is also defined, based on a predetermined air mass. The setpoint value for the air mass can therefore be determined directly by an engine control unit from the torque setpoint value.

It is also known from Beer, M. et al, MTZ Motortechnische Zeitschrift, 61 (2000) 11, p. 730, to adapt an internal combustion engine to different operating states through provision of a two-stage or multistage valve lift switchover means. For example, an electrohydraulic valve lift switchover can be implemented in that a locking element in a control bucket tappet or a rocker arm is actuated by means of oil pressure against a spring and thus, according to the activation or deactivation status, switches between two different valve lift curves. To effect the switchover, an electric current is applied to an electromagnetic valve (3/2-way valve) located in the oil circuit, the valve thereupon opening. The oil pressure builds up and the locking element moves against the spring until the locking operation is completed. When the electromagnetic valve is closed again, the oil pressure dissipates via a leakage line and the locking element, activated by the spring force, slides back into its starting position.

This enables a large volume of air to be supplied in the full load (wide-open throttle) operating range, said volume of air being required in order to deliver a high torque. During partial load operation the valve lift can be reduced in order to supply a smaller air mass to the cylinder. By reducing the opening stroke of the intake valves it is possible, while maintaining the same torque delivery, to open the throttle valve disposed in the intake manifold wider in order to reduce throttle losses thereby.

During the switchover from one valve lift to another valve lift measures must be taken in order to keep the torque delivered before and after the switching operation constant. Otherwise the switching operation would be experienced as unpleasant by the user. Toward that end an intervention is used in order to reduce the engine torque that is output. The aspirated air mass can subsequently be adjusted by way of the throttle valve. A disadvantage with this approach, however, is that during the switchover the engine will not be operated in the consumption-optimized operating state for several power cycles.

It is known from DE 10 2004 061 143 A1 to minimize the torque jump occurring during the valve lift switchover before and after the switching operation by initially outputting a control signal to the throttle valve and triggering the valve lift switchover at a later time which is determined from the dead time and the run time of the filling intervention as well as the switchover duration of the final control elements for the valve lift switchover.

It is known from 10 2004 061 142 A1 to adjust the throttle valve position in accordance with a decreasing ramp function already before the switchover of the valve lift takes place. The torque, increasing or decreasing due to the changed throttle valve position, is compensated by adjusting the injected fuel quantity. The valve lift switchover is performed at an operating point at which a compensation of the torque curve through variation of the supplied fuel quantity is no longer possible. Torque differences remaining after the valve lift switchover are corrected by means of an ignition angle intervention.

SUMMARY

According to various embodiments, a method and an apparatus can be provided, by means of which the switchover operation, and consequently operation in operating states exhibiting poor levels of efficiency, is shortened.

According to an embodiment, in a method for controlling an internal combustion engine having an intake manifold and a throttle valve disposed therein, the pressure in the intake manifold is measured and adjusted to a predefinable setpoint value through variation of the opening angle of the throttle valve, the setpoint value for the pressure in the intake manifold being determined from the setpoint value for the torque and an air mass flow curve and a modified air mass flow curve being provided when the valve lift of the internal combustion engine is changed.

According to a further embodiment, the pressure setpoint value can be determined in parallel fashion for a plurality of different valve lift settings. According to a further embodiment, different pressure setpoint values for a plurality of different valve lift settings can be determined at a maximum in a time period of approximately 400 ms prior to a planned switchover of the valve lift to approximately 200 ms after the completed switchover of the valve lift. According to a further embodiment, the setpoint value for the pressure in the intake manifold can be adjusted before a valve lift switchover takes place. According to a further embodiment, in order to adjust the pressure the throttle valve can be moved from a first position having a first throttle valve angle to a second position having a second throttle valve angle, a third position being selected for a predefinable time period in the interim, said third position having a third throttle valve angle which lies outside of the interval that is formed by the first and second throttle valve angles.

According to another embodiment, the method as described above can be used for controlling the internal combustion engine of a motor vehicle.

According to yet another embodiment, an apparatus for controlling an internal combustion engine which has a device for changing the valve lift, comprises a device for regulating the intake manifold pressure by means of which the opening angle of the throttle valve can be influenced as a control variable in order to adjust the intake manifold pressure to a predefinable setpoint value and wherein the apparatus additionally includes a pilot control device for adjusting the intake manifold pressure setpoint value to the valve lift.

According to a further embodiment of the apparatus, the device for adjusting the pressure setpoint value to the valve lift can be provided for the purpose of determining the pressure setpoint value in parallel fashion for a plurality of different valve lift settings. According to a further embodiment of the apparatus, a delay element may be present which delays the valve lift switchover with respect to a new pressure setpoint value specification. According to a further embodiment of the apparatus, a pilot control device for determining the opening angle of the throttle valve may be present.

According to yet another embodiment, a motor vehicle may have an apparatus as described above.

BRIEF DESCRIPTION OF THE DRAWINGS

The invention shall be explained in more detail below with reference to figures, in which:

FIG. 3 shows the intake manifold pressure and the throttle valve position against time in the case of an valve lift switchover according to various embodiments with a reduction in the intake manifold pressure.

DETAILED DESCRIPTION

Figure 1:
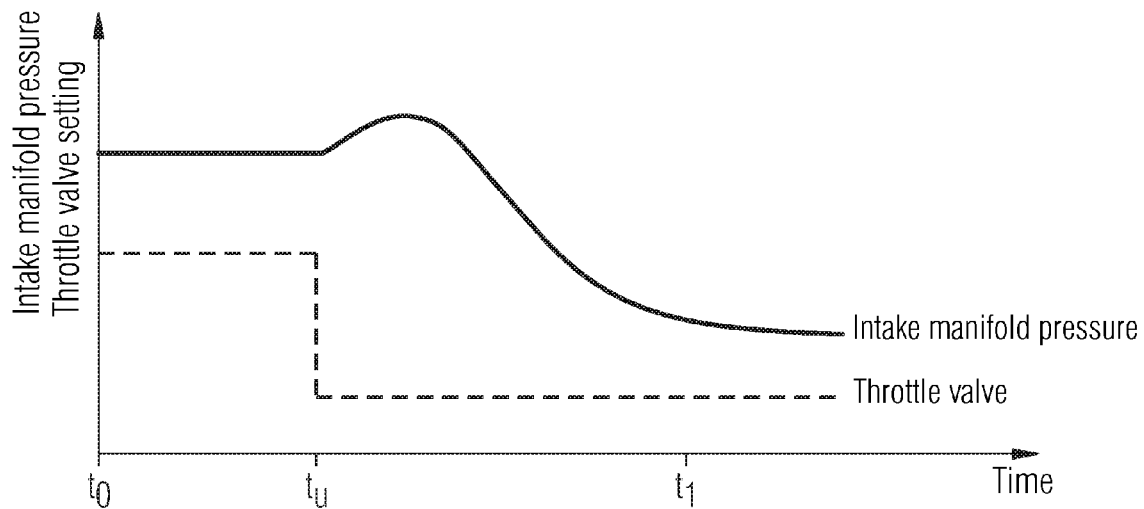
FIG. 1 shows the intake manifold pressure and the throttle valve position against time in the case of a valve lift switchover according to the prior art.

According to various embodiments, in a method for controlling an internal combustion engine, the latter having an intake manifold and a throttle valve disposed therein, the pressure in the intake manifold is regulated through adjustment of the opening angle of the throttle valve and the pressure setpoint value is adjusted when the valve lift of the internal combustion engine is changed.

According to further embodiments, in an apparatus for controlling an internal combustion engine in which a device for regulating the intake manifold pressure is provided by means of which the opening angle of the throttle valve can be influenced as a control variable, a device for adjusting the valve lift of the internal combustion engine additionally is provided along with a device for adjusting the pressure setpoint value to the valve lift.

It is proposed according to various embodiments to regulate the pressure present in the intake manifold instead of the aspirated air mass. In this case a mass air flow meter has been used in the prior art for the purpose of acquiring the control variable. Accordingly the method according to various embodiments employs a pressure sensor for determining the control variable.

Advantageously a pressure sensor is a component that is more robust and less susceptible to contamination than a hot-wire anemometer which is typically used as a mass air flow meter. However, the aspirated air mass and hence the fuel quantity requiring to be injected and the torque delivered can also be determined by way of the pressure in the intake manifold of the internal combustion engine, the valve opening lift and the valve opening time. A mass air flow meter can additionally be provided in order to increase the accuracy of the regulation through redundant measurement and/or to enable a self-calibration of the system.

The relationship (ratio) between intake manifold pressure and aspirated air mass is referred to as the air mass flow curve. If the internal combustion engine has a two-stage or multi-stage valve lift switchover, then the internal combustion engine has a separate air mass flow curve for each possible valve lift. If a setpoint value for the engine torque having a plurality of different valve lifts can be represented, said operating points can preferably be used for torque-neutral switchover of the valve lift. In order not to change the aspirated air mass, a new setpoint value for the pressure is then output by the engine control unit and set by regulating the throttle valve. Compared with the regulation of the inflowing air mass according to the prior art, the regulation of the intake manifold pressure proposed according to various embodiments has the advantage that loss torques and the air mass flow curve of the engine are also taken into account. This avoids, for example, the buildup of intake manifold pressure being requested for an impending valve lift switchover even though pressure ought to be dissipated in the two valve lifts due to different loss torques of the engine. By means of the method according to various embodiments it is thus avoided that the engine is supplied with an excessive mass air flow which can only be compensated by an intervention to alter the mixture formation and/or the ignition angle, entailing increased exhaust gas and consumption values as a consequence.

In an embodiment, the setpoint value for the pressure is determined from the setpoint value for the air mass and the air mass flow curve. In this case the air mass setpoint value is determined as previously with the aid of the torque setpoint value. Calculations can be performed in the control unit in order to determine said values. Alternatively the values can be read out from a numeric engine characteristic map matrix or determined by means of a neural network. Combinations of said embodiment variants are also possible on a case-by-case basis.

If the internal combustion engine has a valve lift switchover, in an embodiment the setpoint value for the pressure in the intake manifold is determined in parallel fashion for a plurality of different valve lift settings. Parallel determination of the pressure setpoint values within the meaning of the various embodiments can be understood to mean either a simultaneous determination by means of a plurality of processors or a plurality of processor cores. However, parallel within the meaning of the various embodiments also means that two values are determined sequentially yet almost simultaneously by means of only one microprocessor and where applicable stored in a buffer memory. Owing to the parallel determination of the pressure values both the currently set setpoint value and the setpoint value that is to be set in the case of a valve lift switchover are available to the control unit. As a result the response time of the control unit in the case of a valve lift switchover is increased as desired.

In order to economize on resources in the control unit, i.e. in particular on memory space and computing time, determining a plurality of different pressure setpoint values for a plurality of different valve lifts can be made subject to limits. For example, in the case of a multistage or continuous valve lift switchover the calculation can be restricted to the current valve lift and the valve lift provided for the next switchover.

In order to economize further on computing capacity and memory space, the calculation of at least two values can additionally be restricted to a short time period prior to a planned switchover of the valve lift up to a predefinable time after the completed switchover of the valve lift. For example, the calculation can be restricted to a time period of approximately 400 ms prior to a planned switchover of the valve lift up to a time of approximately 200 ms after the completed switchover of the valve lift. Thus, the computing capacity needed in order to calculate two pressure values is henceforth only required during the switchover process for a time period of approximately second. In the remaining operating states only one value is calculated in order to save on resources. The specified times are maximum times. It is of course left to the discretion of the person skilled in the art to shorten or lengthen even further the time period during which two pressure values are determined. For example, it is also possible to cease determining the no longer required pressure value during or immediately after the switchover of the valve lift.

In order to restrict corrective interventions to alter ignition angle and injection quantity to a minimum, in an embodiment the intake manifold pressure is adjusted before a valve lift switchover takes place. This takes into account the dead time of the closed-loop control circuit which results from the volume of the intake manifold between the throttle valve and the intake valve and the cubic capacity of the engine. Said volume typically amounts to between approximately 5 l and approximately 15 l. Insofar as it is necessary to reduce the intake manifold pressure from a first valve lift to a second valve lift in order to achieve a torque-neutral switchover of the valve lift, owing to the dead time of the system it is possible to supply the new, reduced setpoint value to the operational controller already before the valve lift switchover. As a result air is inducted at a reduced intake manifold pressure already at the commencement of the switchover and consequently the time of a torque-reducing intervention is reduced. The running smoothness of the engine is improved and fuel saved as a result.

The person skilled in the art will determine the delay between adjustment of the pressure setpoint value and the valve lift switchover according to the dead time of the system. In this case the person skilled in the art will take into account in particular the air mass flow line of the engine and the volume of the intake manifold. In the process the person skilled in the art will take into account in particular a delay of between approximately 50 ms and approximately 400 ms. In order to perform the adjustment of the intake manifold pressure in an even shorter time, in an embodiment variant the throttle valve will be moved from a first position having a first throttle valve angle to a second position having a second throttle valve angle in order to adjust the pressure, with a third position being selected for a predefinable time period in the interim, which third position has a third throttle valve angle which lies outside of the interval that is formed by the first and second throttle valve angles. It has been recognized according to various embodiments that the speed of the adjustment can be increased if the throttle valve is not set to its new end position immediately. Rather, the throttle valve is initially overridden and then set to its new end position. If, for example, the intake manifold pressure is to be increased for the switchover to another valve lift, the throttle valve can, starting from its first position, be opened completely or almost completely in order to flood the intake manifold as quickly as possible up to a predefinable difference from the setpoint pressure. The throttle valve is then set to its new end value and the valve lift switchover performed. As a result of the switchover a further increase in pressure is then produced up to the setpoint pressure. This setting is then maintained by a regulating means, for example a PI, PD or PID controller. In the same way, in order to dissipate an intake manifold pressure, the throttle valve can initially be closed completely or almost completely in order to reduce the pressure rapidly. When a predefinable difference from the setpoint pressure is reached, the regulation of the throttle valve is reactivated so that the latter sets itself to its second position at which the new intake manifold pressure is present.

The third throttle valve position, which serves for quickly reaching a new setpoint value, can be canceled either when the intake manifold pressure has reached a predefinable difference from the setpoint pressure and/or when a predefinable time period has expired. Said time period can amount to between approximately 7.5 ms and approximately 75 ms. In the case of a four-cylinder internal combustion engine this is equivalent to approximately one power stroke to approximately ten power strokes at full load.

The throttle valve position can be predefined by means of a pilot control device during the switchover and/or during stationary operation. Remaining deviations can then still be corrected on a case-by-case basis by means of a control apparatus. In this instance it is left to the discretion of the person skilled in the art also to actively control the switchover operation or else to provide the regulation only during stationary operation and to control the switchover operation solely by means of the pilot control device.

FIG. 1 shows the intake manifold pressure as an unbroken line and the throttle valve position (dashed line) plotted against time. At time $t_0$ the internal combustion engine is operated with a small valve lift. The aspirated air mass is regulated by means of the throttle valve position to a setpoint value which is determined by means of the engine control unit and monitored by means of a mass air flow meter. Since the air mass inducted by the engine in the case of a small valve lift is relatively small, a comparatively large intake manifold pressure is established.

At time $t_u$ the valve lift is switched over to a greater value. This typically happens when a greater torque is called for via a corresponding driver request. Accordingly the throttle valve position is also changed in order to provide a greater air mass. The simultaneous switchover of throttle valve and valve lift leads to an increase in the intake manifold pressure. The operation of the internal combustion engine with large valve lift at simultaneously increasing intake manifold pressure leads to an excess of torque which can be perceived as irregular engine running or in the extreme case as bucking. In order to avoid such a torque peak, the torque is reduced immediately after the switchover by means of an intervention to alter the ignition angle and/or the injection in order to provide a torque-neutral switchover. During the time period of the ignition angle intervention the internal combustion engine exhibits poor efficiency and as a result thereof high fuel consumption. If a simultaneous intervention is made to adjust the injection system, high nitrous oxide emissions can be produced in addition.

Only at time $t_1$ has the intake manifold pressure adjusted to the new setpoint value. Starting from this time instant the actual value for the air mass corresponds to the setpoint value for the air mass. The internal combustion engine now operates with a high valve lift.

Figure 2:
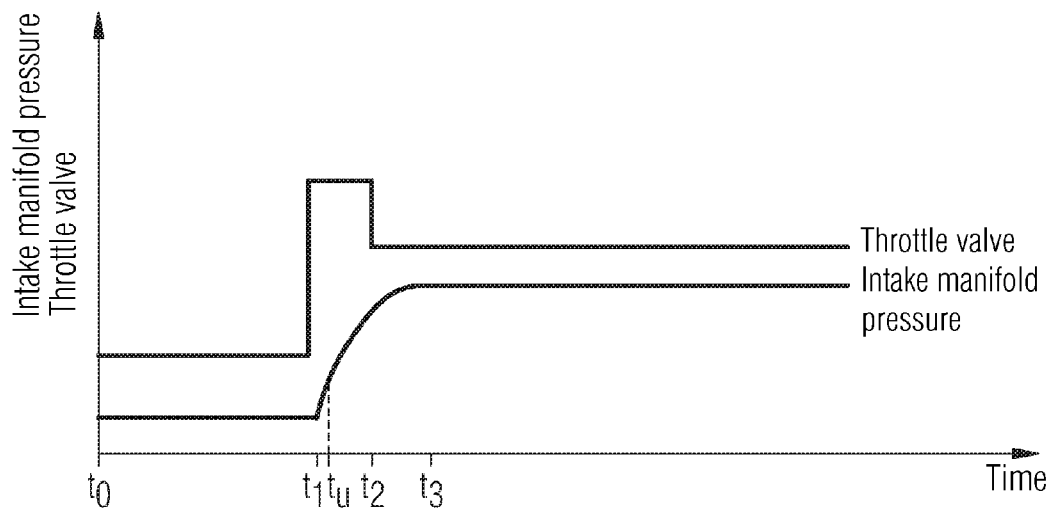
FIG. 2 shows the intake manifold pressure and the throttle valve position against time in the case of a valve lift switchover according to various embodiments with an increase in the intake manifold pressure.

FIG. 2 shows the situation in the case of a switchover of the valve lift according to the method. FIG. 2 also shows the intake manifold pressure and the throttle valve position against time. At time $t_0$ the internal combustion engine is operated at a first valve lift. For example, in the present instance this can be a large valve lift. The throttle valve is set at a first position in which the valve is relatively closed in order to provide a low intake manifold pressure. In the case of the performance of the method according to FIG. 2 the throttle valve position is adjusted in such a way that a predefinable intake manifold pressure is established. In this case the setpoint value for the intake manifold pressure is selected such that the desired air mass is inducted. From the low intake manifold pressure and the large valve opening there results a partial load mode of operation having a comparatively small aspirated air mass.

In order to reduce throttle losses while maintaining constant torque it is aimed to reduce the valve lift and in return open the throttle valve wider. At time $t_1$ the throttle valve is therefore moved into an open position. This can be a full or almost full opening of the throttle valve. As a result of this measure ambient air now streams very quickly into the intake manifold and leads to a rapid increase in the intake manifold pressure. In this case also, a possible increase in torque owing to the increased intake manifold pressure is compensated by means of ignition intervention. Once the intake manifold pressure has reached a predefinable difference from the setpoint pressure, the valve lift is switched over, at time $t_u$, from the starting value to the target value. Since a different air mass flow characteristic with lower air throughput is now present, the intake manifold pressure continues to increase. At time $t_2$ the throttle valve is moved into the end position precalculated for it by the pilot control and once again adjusted such that the desired intake manifold pressure is set.

The intake manifold pressure, and hence the aspirated air mass, has set itself to the new target value already at time $t_3$. An intervention to correct ignition or injection in order to reduce torque is no longer necessary at this time. As a result of the reduced switching time compared with the prior art and the avoidance of overshoots in the intake manifold pressure the time taken for torque-reducing interventions is shortened. The running smoothness of the engine is improved and fuel saved as a result.

FIG. 3 shows the method according to various embodiments in the case of switchover from a high intake manifold pressure to a low intake manifold pressure. This can be necessary for example when it is desired to switch over from a low valve lift to a large valve lift.

At time $t_0$ the vehicle is operated with low valve lift. In this case the intake manifold pressure is regulated by adjusting the throttle valve position in such a way that a specific, predefinable air mass is aspirated.

At time $t_1$ the switchover operation to large valve lift starts initially with the throttle valve being closed further. In particular the throttle valve is moved into a position which is closed further than the precalculated setpoint value after the valve lift switchover. The throttle valve can be fully closed, for example.

Since the internal combustion engine continues to aspirate air from the intake manifold when the throttle valve is closed, the intake manifold pressure decreases. After a predefinable time period and/or when a specific pressure is reached, the throttle valve is moved, at time $t_2$, into its precalculated end position and influenced there by a control apparatus in such a way that the precalculated intake manifold pressure is established. The switchover of the valve lift takes place at time $t_u$, which in the exemplary embodiment according to FIG. 3 lies after $t_2$. Already at time $t_3$ the engine has again reached a stable operating point. From this time no consumption-increasing or comfort-reducing engine control interventions of any kind are necessary. An overshoot, as can be seen in FIG. 1, no longer occurs in the case of the control method according to various embodiments.

The person skilled in the art is of course conscious of the fact that the embodiment variants according to FIG. 2 and FIG. 3 are presented simply by way of example. For example, the switchover time $t_u$ of the valve lift can in any case come before or after the time $t_2$. The principles explained in the exemplary embodiments with reference to a two-stage valve lift switchover can be applied without problem to multistage or continuous valve lift switchovers.

What is claimed is:

1. A method for controlling an internal combustion engine having an intake manifold and a throttle valve disposed therein, the method comprising:
    measuring the pressure in the intake manifold and adjusting the pressure to a predefinable setpoint value through variation of an opening angle of the throttle valve,
    determining a pressure setpoint value for the pressure in the intake manifold from a torque setpoint value and an air mass flow curve,
    providing a modified air mass flow curve when a valve lift of the internal combustion engine is changed;
    wherein in order to adjust the pressure, the throttle valve is temporarily over or under adjusted relative to a final value for the pressure defined by the setpoint value.

2. The method according to claim 1, wherein the pressure setpoint value is determined in parallel fashion for a plurality of different valve lift settings.

3. The method according to claim 2, wherein different pressure setpoint values for a plurality of different valve lift settings are determined at a maximum in a time period of approximately 400 ms prior to a planned switchover of the valve lift to approximately 200 ms after the completed switchover of the valve lift.

4. The method according to claim 1, wherein the setpoint value for the pressure in the intake manifold is adjusted before a valve lift switchover takes place.

5. The method according to claim 1, wherein in order to adjust the pressure the throttle valve is moved from a first position having a first throttle valve angle to a second position having a second throttle valve angle, a third position being selected for a predefinable time period in the interim, said third position having a third throttle valve angle which lies outside of the interval that is formed by the first and second throttle valve angles.

6. The method according to claim 1, wherein the method is used for controlling the internal combustion engine of a motor vehicle.

7. An apparatus for controlling an internal combustion engine which has a device for changing the valve lift, wherein the apparatus comprises a device for regulating the intake manifold pressure by means of which the opening angle of the throttle valve can be influenced as a control variable in order to adjust the intake manifold pressure to a predefinable setpoint value and wherein the apparatus additionally includes a pilot control device for adjusting the intake manifold pressure setpoint value to the valve lift;
    wherein in order to adjust the intake manifold pressure, the throttle valve is temporarily over or under adjusted relative to a final value for the pressure defined by the setpoint value.

8. The apparatus according to claim 7, wherein the device for adjusting the pressure setpoint value to the valve lift is provided for the purpose of determining the pressure setpoint value in parallel fashion for a plurality of different valve lift settings.

9. The apparatus according to claim 7, wherein a delay element is present which delays the valve lift switchover with respect to a new pressure setpoint value specification.

10. The apparatus according to claim 7, wherein a pilot control device for determining the opening angle of the throttle valve is present.

11. A motor vehicle having an apparatus according to claim 7.

12. A system for controlling an internal combustion engine having an intake manifold and a throttle valve disposed therein, the system being configured to measure the pressure in the intake manifold, to adjust the pressure to a predefinable setpoint value through variation of the opening angle of the throttle valve, to determine the setpoint value for the pressure in the intake manifold from the setpoint value for the torque and an air mass flow curve, and to provide a modified air mass flow curve when the valve lift of the internal combustion engine is changed;

wherein in order to adjust the pressure, the throttle valve is temporarily over or under adjusted relative to a final value for the pressure defined by the setpoint value.

13. The system according to claim 12, wherein the pressure setpoint value is determined in parallel fashion for a plurality of different valve lift settings.

14. The system according to claim 13, wherein different pressure setpoint values for a plurality of different valve lift settings are determined at a maximum in a time period of approximately 400 ms prior to a planned switchover of the valve lift to approximately 200 ms after the completed switchover of the valve lift.

15. The system according to claim 12, wherein the setpoint value for the pressure in the intake manifold is adjusted before a valve lift switchover takes place.

16. The system according to claim 12, wherein in order to adjust the pressure the throttle valve is moved from a first position having a first throttle valve angle to a second position having a second throttle valve angle, a third position being selected for a predefinable time period in the interim, said third position having a third throttle valve angle which lies outside of the interval that is formed by the first and second throttle valve angles.

17. A system for controlling an internal combustion engine having an intake manifold and a throttle valve disposed therein, wherein the system is configured to:
adjust a pressure in the intake manifold through variation of an opening angle of the throttle valve;
determine a pressure setpoint value for the pressure in the intake manifold from a torque setpoint value and an air mass flow curve;
utilize a modified air mass flow curve when a valve lift of the internal combustion engine is changed;
wherein in order to adjust the pressure, the throttle valve is temporarily over or under adjusted relative to a final position for the pressure defined by the pressure setpoint value.

18. A system in accordance with claim 17, wherein in order to adjust the pressure, the throttle valve is moved from a first position having a first throttle valve angle to the final position, the final position comprising a second position having a second throttle valve angle, via a third position, the third position having a third throttle valve angle different than the first and second throttle valve angles.

* * * * *